US006255391B1

(12) United States Patent
Henrich

(10) Patent No.: US 6,255,391 B1
(45) Date of Patent: *Jul. 3, 2001

(54) MATERIAL FOR THE PRODUCTION OF BUILDING MATERIALS OR SHAPED ARTICLES

(75) Inventor: Rolf Henrich, Glashütte (DE)

(73) Assignee: Netro-Products GmbH & Co. KG, Ruschberg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/028,237

(22) Filed: Feb. 23, 1998

(30) Foreign Application Priority Data

Feb. 21, 1997 (DE) .......................................... 297 03 078 U

(51) Int. Cl.⁷ ..................................................... C08L 53/00
(52) U.S. Cl. ............................ 525/94; 525/116; 525/120; 525/122; 523/220; 521/50
(58) Field of Search ............................... 521/50; 523/218; 524/495, 496; 525/94, 116, 120, 122

(56) References Cited

U.S. PATENT DOCUMENTS

| 2,832,997 | * | 5/1958 | Bristol ........................................ 18/53 |
| 3,909,463 | * | 9/1975 | Hartman ................................ 260/845 |
| 4,585,605 | * | 4/1986 | Kadota et al. ........................... 264/51 |
| 4,614,763 | * | 9/1986 | Trabert et al. ........................... 525/66 |
| 4,806,587 |   | 2/1989 | Trabert et al. . |
| 5,030,662 | * | 7/1991 | Banerjie ................................ 521/43.5 |
| 5,312,573 | * | 5/1994 | Rosenbaum et al. ................... 264/37 |
| 5,356,958 | * | 10/1994 | Matthews ............................... 523/219 |
| 5,387,647 |   | 2/1995 | Eichenauer et al. . |
| 5,580,649 | * | 12/1996 | Marioka et al. ................... 428/304.4 |
| 5,635,562 | * | 6/1997 | Malcom ................................. 521/50 |

FOREIGN PATENT DOCUMENTS

| 6904666 | 4/1969 | (DE) . |
| 2159735 | 12/1971 | (DE) ................................ C08J/5/20 |
| 3438388 | 4/1986 | (DE) . |
| 3523984 | 1/1987 | (DE) . |
| 3706248 | 9/1988 | (DE) . |
| 3919995 | 1/1991 | (DE) . |
| 4118343 | 1/1992 | (DE) . |
| 4202431 | 8/1993 | (DE) . |
| 4343571 | 6/1995 | (DE) . |
| 295 06 903 U | 10/1995 | (DE) . |
| 296 16 127 U | 12/1996 | (DE) . |
| 0056123 | 7/1982 | (EP) . |
| 0143131 | 6/1985 | (EP) . |
| 0476293 | 3/1992 | (EP) . |
| 0557923 | 9/1993 | (EP) . |
| 1382749 | 2/1975 | (GB) . |
| 1586882 | 3/1981 | (GB) . |
| 7697172 | 11/1976 | (JP) . |
| 563811 | 5/1981 | (SU) . |

* cited by examiner

*Primary Examiner*—Edward J. Cain
*Assistant Examiner*—Kat Wyrozebski
(74) *Attorney, Agent, or Firm*—Horst M. Kasper

(57) ABSTRACT

A material for producing a building material or a shaped article, wherein said material comprises a melt-mixture of thermoplastic material and rubber material.

19 Claims, No Drawings

MATERIAL FOR THE PRODUCTION OF BUILDING MATERIALS OR SHAPED ARTICLES

The present invention relates to a material for producing a building material or a shaped article, to building materials and shaped articles such as sheets made from such material, and to methods of producing building materials and shaped articles.

German Patent No. 21 59 735 published in 1976 describes the use of old vehicle tires, which are transformed by grinding to rubber powder ("rubber meal") and/or coarse rubber powder. ("rough rubber meal") to be used for the manufacture of Ion exchangers.

German Publication ("Auslegeschrift") No. 1086437 describes a process of production of anion-selective membranes (diaphragms) whereby a mixed polymer containing 25 to 70% of an aromatic mono-vinyl-compound and of an aliphatic conjugated diene-compound is formed to a film-like membrane, this membrane being made insoluble by cyclisation or vulcanisation and which will then be chlorine-alcylated and finally animated.

In German Patent No. 21 59 735 it is stated that according to the process of German Publication No. 1 086 437 a defined compound namely a certain mixing polymer, consisting of aromatic and aliphatic parts, is the starting material, whereas according to German Patent No. 21 59 735 the rubber powder and/or the coarse rubber powder is a carbon (soot) filled vulcanisate.

In German Patent No. 21 59 735 it is further explained that a further difference from the prior art according to German Publication No. 1086473 is the fact that the latter describes the production of membranes whereas in the case of the products of Patent 21 59 735, there is no defined shape.

In relation of the definitions of the contents of rubber-powder ("rubber meal") or coarse rubber powder ("rough rubber meal") in the present specification, it is intended that the definitions will be the same as those used in German Patent No. 21 59 735.

The other prior art described in German Patent No. 21 59 735 is also included herein by reference.

Viewed from one aspect the invention provides a material for producing a building material or a shaped article, wherein said material comprises a melt-mixture of thermoplastic material and rubber material.

Viewed from another aspect the invention provides a mixture for melting to form a building material or a shaped article, said mixture comprising a thermoplastic material mixed with a rubber material.

The basis of this invention is the surprising realization that a mixture of rubber and thermoplastic materials are extremely apt to be shape-transformed to a building-material or a shaped article, for example by way of extrusion, especially by extrusion at higher temperatures in order to produce sheet-like products.

It is preferred to provide a mixture of rubber powder and/or rough rubber powder with thermoplastics which are powder-like or which consist of separated particles, possibly together with fillers suitable for these starting materials or with inlayed material like glass filaments and/or metal-filaments. Thus the mixture may eventually be provided with additional admixed fillers and/or inlayed material.

Preferably, the rubber material and the thermoplastic material in the shape of particular products or articles are bound together mechanically and/or by heat and/or by pressure and or by radiation.

Viewed from another aspect the invention provides a method of producing a building material or a shaped article, comprising mixing a thermoplastic material with a rubber material, heating said mixture to form a melt-mixture and forming said melt mixture to the required form of said building material or said shaped article.

A preferred method of manufacture consists in mechanically mixing the starting materials in granular form followed by using an extrusion-device in order to achieve the wanted shape, for example the shape of sheets.

Coarse rubber powder is especially preferred as the rubber starting material.

As starting material for the thermoplastic content, polyethylene in powder-form is especially suitable, whereby old polyethylene which is made by recycling for example of polyethylene bottle closures is preferably used.

The materials according to this invention can especially be made into sheets for roofing purposes and have excellent chemical and physical properties. These sheets are extremely weather (corrosion) and temperature resistant; for example measurements on test roofs using the sheeting of the invention showed that the sheeting could resist temperatures between minus 20 degrees Celsius and plus 80 degrees Celsius without any damage.

A further advantage of the sheets is their very low inflammability.

The sheets according to this invention and other shaped materials according to this invention further can be used in a generally known manner as floor elements or acoustic insulation elements.

The mixture according to this invention can also be supplied as a so called melt-mixture which can then be further processed into end products.

Additional fields of using the materials according to this invention are insulating sheets in any dimensions and/or roofing underlay sheets.

As thermoplastic component of the material mixture according to this invention are to be named, apart from polyethylene, polypropylene, thermoplastic polyurethanes and polyvinyl compounds.

The breaking strain of the sheets made out of the material according to this invention lies in the area of 190 to 200%.

The specific weight lies in the area between 1,2 and 1,3.

The hardness is preferably in the area between 90–100, namely Shore A-hardness.

If necessary the material according to this invention can contain additional materials (additives) and/or fillers, for example foam-materials as granules with closed cells and/or with open cells for example polystyrene-granules.

Furthermore, filaments can be incorporated for example glass-filaments and/or metal-filaments and/or carbon fibres.

As brighteners can be incorporated pigments, for example titanium-dioxide.

Furthermore, irradiation tests were carried out on the materials according to the invention, which revealed that these materials have for example also a high resistance to ultra-violet-rays.

The present invention will be further described by the following example

EXAMPLE 25 kilograms of polyethylene-powder with a particle size of 3 mm and 20 kilograms of coarse rubber powder with a particle size of 1 mm are mixed together for 10 minutes at a temperature of 180° C.

If desired, for thermoplastic mixtures further additives which are known per se, can be added.

A part of the content of the mixer is regranulated in a manner known per se. The produced granules form a material ready for the market.

The other part of the content of the resulting mixture is transported by suction in a manner known per se to the extruder and is extruded into building materials in the shape of sheets.

In this way soundproof materials are produced which are temperature resistant from minus 20 degrees Celsius up to plus 85 degrees Celsius. Moreover, the sheets are waterproof and are resistant to abrasion and against breaking.

The material according to this invention may be used as roofing-tiles instead of slates and further as shoe-soles, plaster cups (gypsum-cups) and as so called "alligatoring" (elephant-skin), i.e. as sheets having a thickness up to about 5 millimeters (5 mm).

The using and handling of the sheets produced according to this invention can be carried out by any known method, for example by cutting and planing; also forming into any desired shape is possible by heat; further this material can be fused (welded) easily.

The material may thus be in sheet-shape before it is further processed.

As thermoplastic components apart from the rubber powder or the rough rubber powder are suitable especially polyethylene, polypropylene, polyurethane and polyvinyl-compounds, for example polystyrene.

The binding of the material's contents is effected especially by so called van-der-Waals bonds, which are triggered by pressure (melting-pressure) and/or heat and/or radiation with the result, that a so-called melt-mixture is created.

According to a preferred embodiment, the rubber-material as well as the thermoplastic material is in powder form.

By way of example, the tested physical properties of a sheet produced by melt-extrusion of a powder-like mixture of thermoplastic and rubber-materials followed by cooling were as follows:
1. Density (specific weight), Norm DIN 53479 is 1,23 g/cm$^3$
2. Strike bend strength pre-extrusion at 220 degrees Celsius and 250 bar. Norm:Charpy-arrangement, result: no break.
3. Impact bend flexural strength in cold conditions at minus 40 degrees Celsius. Production and test-conditions were the same as in test number 2, result: no break.
4. Impact bend flexural strength at normal temperature, conditions of production and of testing were the same as in test number 3. Result: no break.
5. Tensile-strength, conditions of production and of the test are the same as in test number 2, test-norm DIN 53455/3/3 result: the tensile-strength is 8.7 MPa.
6. The strain at which the material fails in tension ("Reißdehnung"), Conditions of producing the material and of the test are the same as in test number 5. DIN 53455/3/3 result, this strain is above 100%.
7. Shore A hardness: 95

What is claimed is:

1. A shaped article produced using a material essentially consisting of a powder of a thermoplastic material, and a powder of a rubber material, wherein the thermoplastic material and the rubber material are formed as a melt-mixture and wherein the shaped article has a Shore hardness of more than about 90.

2. The sheet material as claimed in claim 1, wherein the composite has been formed by melt-extrusion.

3. A shaped article produced using a material essentially consisting of
   a powder of a thermoplastic material, and
   a powder of a rubber material, wherein the thermoplastic material and the rubber material are formed as a melt-mixture and wherein the shaped article has a Shore hardness of from about 90 to 100.

4. The shaped article according to claim 3, wherein the powder of thermoplastic material and the powder of rubber material is bound together.

5. The shaped article according to claim 3, wherein article has the form of a roofing sheet.

6. The shaped article according to claim 5, wherein the roofing sheet exhibits very low inflammability.

7. The shaped article according to claim 5, wherein the thermoplastic material is a member selected from the group consisting of polyethylene, polypropylene, thermoplastic polyurethane, polyvinyl compound, and mixtures thereof.

8. The shaped article according to claim 5, wherein the roofing sheet exhibits a breaking strain of from about 190 percent to 200 percent.

9. The shaped article according to claim 5, wherein the roofing sheet exhibits a specific weight of from about 1.2 to 1.3.

10. The shaped article according to claim 5, wherein the roofing sheet exhibits a high resistance to ultraviolet rays.

11. The shaped article according to claim 1, wherein the powder of thermoplastic material and the powder of rubber material is bound together.

12. The shaped article according to claim 1, wherein the article has the form of a roofing sheet.

13. The shaped article according to claim 12, wherein the roofing sheet exhibits very low inflammability.

14. The shaped article according to claim 10, wherein the thermoplastic material is a member selected from the group consisting of polyethylene, polypropylene, thermoplastic polyurethane, polyvinyl compound, and mixtures thereof.

15. The shaped article according to claim 12, wherein the roofing sheet exhibits a breaking strain of from about 190 percent to 200 percent.

16. The shaped article according to claim 12, wherein the roofing sheet exhibits a specific weight of from about 1.2 to 1.3.

17. The shaped article according to claim 12, wherein the roofing sheet exhibits a high resistance to ultraviolet rays.

18. The sheet material as claimed in claim 3, wherein the composite has been formed by melt-extrusion.

19. The shaped article according to claim 1, wherein the thermoplastic material is a member selected from the group consisting of polyethylene, polypropylene, thermoplastic polyurethane, polyvinyl compound, and mixtures thereof.

* * * * *